United States Patent
Janik et al.

(10) Patent No.: US 12,401,228 B2
(45) Date of Patent: Aug. 26, 2025

(54) LIGHT FIXTURE WITH WIRELESS RESONANT COUPLING

(71) Applicant: SIGNIFY HOLDING B.V., Eindhoven (NL)

(72) Inventors: Raymond George Janik, Fayetteville, GA (US); Khurram Zeshan Moghal, Senoia, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 196 days.

(21) Appl. No.: 18/279,000

(22) PCT Filed: Feb. 21, 2022

(86) PCT No.: PCT/EP2022/054204
§ 371 (c)(1),
(2) Date: Aug. 25, 2023

(87) PCT Pub. No.: WO2022/179968
PCT Pub. Date: Sep. 1, 2022

(65) Prior Publication Data
US 2024/0164002 A1    May 16, 2024

Related U.S. Application Data

(60) Provisional application No. 63/153,750, filed on Feb. 25, 2021.

(30) Foreign Application Priority Data

Mar. 4, 2021 (EP) ..................................... 21160716

(51) Int. Cl.
*H05B 47/19* (2020.01)
*H02J 50/00* (2016.01)
(Continued)

(52) U.S. Cl.
CPC ............ *H05B 47/19* (2020.01); *H02J 50/005* (2020.01); *H02J 50/12* (2016.02); *H02J 50/70* (2016.02);
(Continued)

(58) Field of Classification Search
CPC .. H05B 47/19; H05B 45/325; H05B 45/3725; H05B 47/14; H02J 50/005; H02J 50/12; H02J 50/70
See application file for complete search history.

(56) References Cited

U.S. PATENT DOCUMENTS 9,276,413 B1 * 3/2016 Zhang ..................... H02J 50/12
9,723,699 B1 * 8/2017 Von Novak, III ..... H05B 47/19
(Continued)

FOREIGN PATENT DOCUMENTS

CN   108847706 A   11/2018
EP   2597748 A2    5/2013
(Continued)

*Primary Examiner* — Abdullah A Riyami
*Assistant Examiner* — Syed M Kaiser

(57) ABSTRACT

A lighting device having wireless resonant coupling includes a wireless power transmitter unit and a light module that includes a light source. The wireless power transmitter unit is configured to provide power to the light module wirelessly by transmitting a power waveform to the light module. An amplitude of a fundamental frequency component of the power waveform equals an amplitude of a third harmonic frequency component of the power waveform.

15 Claims, 5 Drawing Sheets

(51) Int. Cl.
  *H02J 50/12* (2016.01)
  *H02J 50/70* (2016.01)
  *H05B 45/325* (2020.01)
  *H05B 45/3725* (2020.01)
  *H05B 47/14* (2020.01)

(52) U.S. Cl.
  CPC ....... *H05B 45/325* (2020.01); *H05B 45/3725* (2020.01); *H05B 47/14* (2020.01)

(56) References Cited

U.S. PATENT DOCUMENTS

| | | | |
|---|---|---|---|
| 2012/0212150 A1 | 8/2012 | Lakirovich et al. | |
| 2016/0329752 A1* | 11/2016 | Bae | H02J 7/00034 |
| 2017/0117752 A1* | 4/2017 | Kaechi | H02J 50/60 |
| 2018/0159371 A1* | 6/2018 | Kim | H02J 50/80 |
| 2018/0212463 A1 | 7/2018 | Van Boheemen et al. | |
| 2018/0269725 A1* | 9/2018 | Yeo | H02J 50/12 |
| 2018/0351392 A1* | 12/2018 | Malkin | H02J 50/12 |
| 2019/0109498 A1* | 4/2019 | Stingu | H03F 3/217 |
| 2019/0366866 A1 | 12/2019 | Cha et al. | |
| 2021/0057934 A1* | 2/2021 | Zhao | H02J 50/12 |
| 2021/0188106 A1* | 6/2021 | Asa | H02M 1/4216 |

FOREIGN PATENT DOCUMENTS

| | | |
|---|---|---|
| KR | 20120129821 A | 11/2012 |
| WO | 2014127036 A1 | 8/2014 |

\* cited by examiner

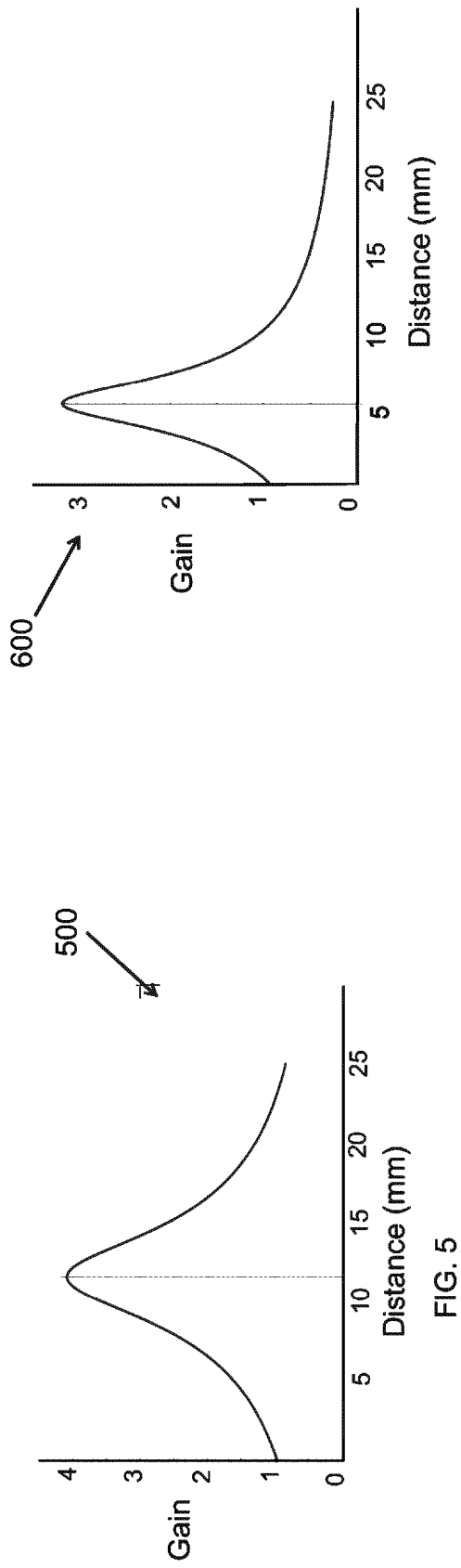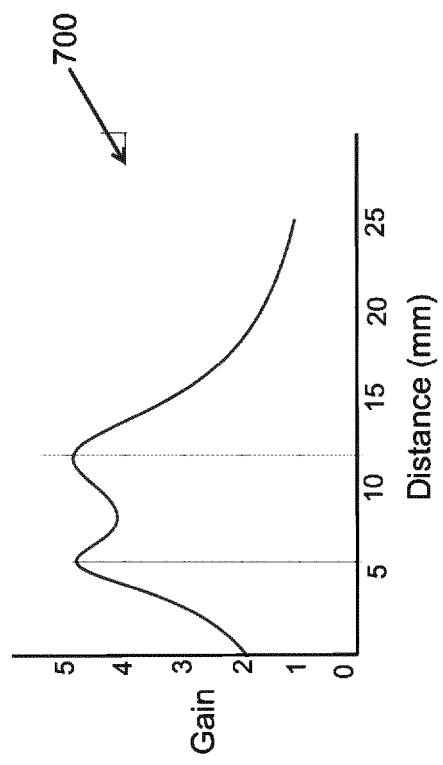
FIG. 5
FIG. 6
FIG. 7

LIGHT FIXTURE WITH WIRELESS RESONANT COUPLING

CROSS-REFERENCE TO PRIOR APPLICATIONS

This application is the U.S. National Phase application under 35 U.S.C. § 371 of International Application No. PCT/EP2022/054204, filed on Feb. 21, 2022, which claims the benefit of European Patent Application No. 21160716, filed on Mar. 4, 2021 and U.S. Provisional Application No. 63/153,750, filed on Feb. 25, 2021. These applications are hereby incorporated by reference herein.

TECHNICAL FIELD

The present disclosure relates generally to lighting fixtures, and more particularly to light fixtures having a wireless power transmitter.

BACKGROUND

Some light fixtures (e.g., light emitting diode (LED) light fixtures) include a wireless power transmitter that wirelessly provides power to the light source of the light fixtures via a power receiving component of the light fixtures. The power receiving component of such light fixtures is preferably consistently spaced for optimum power transfer from the wireless power transmitter of the light fixture. For example, the optimum and consistent separation can facilitate power efficiency and minimize variations in the light provided by multiple light fixtures. However, installing the wireless power transmitter and the power receiving component of light fixtures separated at an optimum and consistent distance from each other may be challenging. Thus, a solution that accommodates variations in the separation between the wireless power transmitter and the power receiving component of LED light fixtures may be desirable.

SUMMARY

The present disclosure relates generally to lighting fixtures, and more particularly to light fixtures having a wireless power transmitter. In an example embodiment, a lighting device having wireless resonant coupling includes a wireless power transmitter unit and a light module that includes a light source. The wireless power transmitter unit is configured to provide power to the light module wirelessly by transmitting a power waveform to the light module. An amplitude of a fundamental frequency component of the power waveform equals an amplitude of a third harmonic frequency component of the power waveform.

In another example embodiment, a method of operation of a resonant coupling wireless light fixture includes providing power, by a wireless power transmitter unit of the resonant coupling wireless light fixture, to a light module of the resonant coupling wireless light fixture by transmitting a power waveform. The method further includes receiving, by the light module, the power waveform, and providing, by the light module, a light based on the power received from the wireless power transmitter unit via the power waveform, where a fundamental frequency component of the power waveform and a third harmonic frequency component of the power waveform have equal amplitudes.

These and other aspects, objects, features, and embodiments will be apparent from the following description and the appended claims.

BRIEF DESCRIPTION OF THE FIGURES

Reference will now be made to the accompanying drawings, where:

FIG. 5 shows a graph of the relationship between the distance D shown of FIG. 1 and the gain of the circuit of FIG. 4 with respect to the fundamental frequency of the power waveform according to an example embodiment;

FIG. 6 shows a graph of the relationship between the distance D shown of FIG. 1 and the gain of the circuit of FIG. 4 with respect to the third harmonic frequency of the power waveform according to an example embodiment;

FIG. 7 shows a graph of the relationship between the distance D shown in FIG. 1 and the combined gain of the circuit of FIG. 4 with respect to the fundamental and third harmonic frequencies of the power waveform of FIG. 1 according to an example embodiment;

Figure 1:
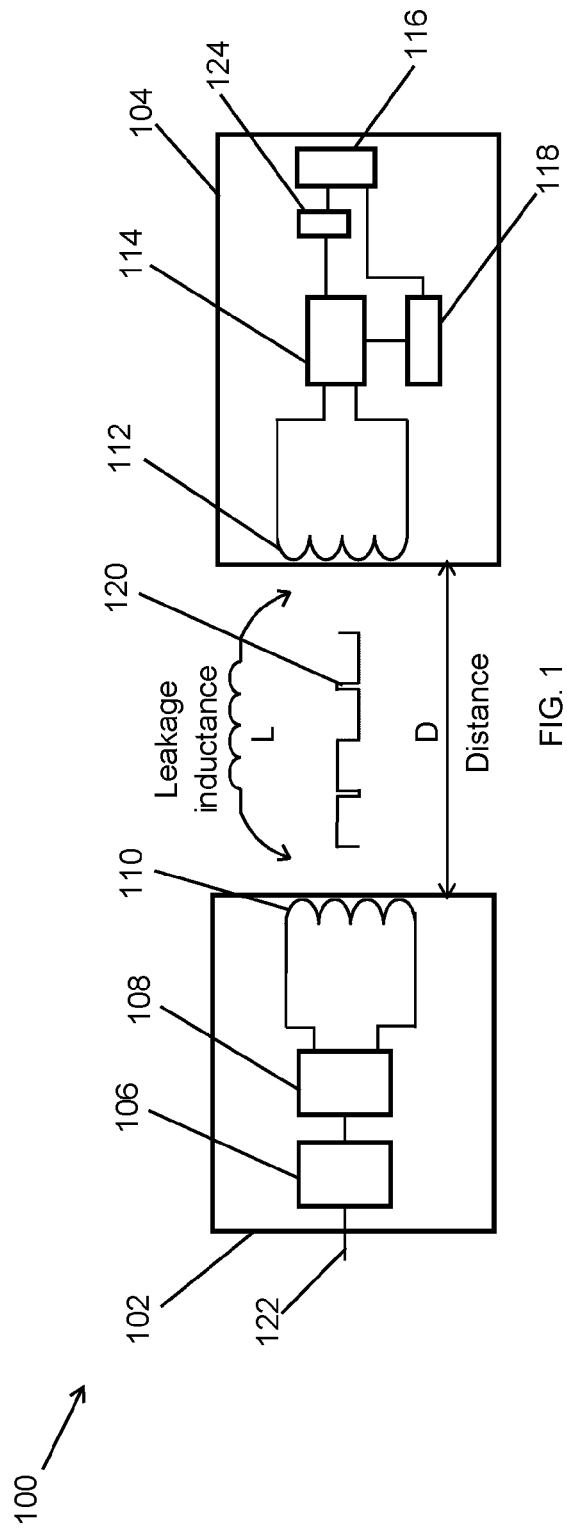
FIG. 1 illustrates a resonant coupling wireless light fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a resonant coupling wireless light fixture 100 according to an example embodiment. In some example embodiments, the light fixture 100 may be a lighting device that provides an illumination light. The light fixture 100 may include a wireless power transmitter unit 102 and a light module 104. The wireless power transmitter unit 102 wirelessly provides power to the light module 104, and the light module 104 operates using the power wirelessly received from the wireless power transmitter unit 102. The wireless power transmitter unit 102 may wirelessly provide power to the light module 104 by transmitting a power waveform 120 to the light module 104 wirelessly. As shown in FIG. 1, the wireless power transmitter unit 102 and the light module 104 may be spaced from each other by a distance D. In particular, a coil 110 of the wireless power transmitter unit 102 and a coil 112 of the light module 104 are separated by the distance D.

In some example embodiments, the wireless power transmitter unit 102 includes an interface module 106 and a power waveform generator 108. For example, the interface module 106 may be an alternating current (AC)-to-direct current (DC) converter that receives an AC voltage and outputs DC voltage. To illustrate, the interface module 106 may receive AC voltage via an input connection 122, for example, from utility power supply. In some alternative embodiments, the interface module 106 may include a DC-to-DC converter that receives, for example, input DC voltage having a particular voltage level via the input connection 122 and outputs output DC voltage that has a different level. In some alternative embodiments, the interface module 106 may include one or more wiring connections that directly (i.e., without conversion) transfer the DC input voltage received via the input connection 122 to the power waveform generator 108.

In some example embodiments, the wireless power transmitter unit 102 includes a coil 110 that is coupled to the power waveform generator 108. The power waveform generator 108 along with the coil 110 may generate and wirelessly transmit the power waveform 120 using the DC voltage from the interface module 106.

In some example embodiments, the light module 104 includes a coil 112, a resonance capacitor 114, DC power circuitry 124, a light source 116 (e.g., LED light source), and feedback circuitry 118. The light module 104 may receive the power waveform 120 from the wireless power transmitter unit 102 via the coil 112. The coil 112 is coupled to the resonance capacitor 114. The resonance capacitor 114 may include a fixed capacitor and a switched capacitor as explained below in more detail. The switched capacitor may be controlled by the feedback circuitry 118 based on the current flowing through the light source 116. The DC power circuitry 124 may provide DC voltage/current to the light source 116 from the power received from the wireless power transmitter unit 102 via the coil 112. For example, the DC power circuitry 124 may include a rectifier and a DC output capacitor that provide DC voltage/current to the light source 116.

In some example embodiments, the feedback circuitry 118 includes a current sensor and pulse width modulation (PWM) circuit. The current sensor may sense the current flowing through the light source 116, and the PWM circuit may generate a PWM signal based on the current flowing through the light source 116. For example, the PWM circuit may change (e.g., increase and decrease) and maintain the pulse width of the PWM signal based on the amount of the current flowing through the light source 116. The PWM signal is provided to the switched capacitor of the resonance capacitor 114 to control (e.g., increase, decrease, and maintain) the capacitance of the switched capacitor based on the pulse width of the PWM signal, effectively controlling the capacitance of the resonance capacitor 114, as can be readily understood by those of ordinary skill in the art. Changing the capacitance of the resonance capacitor 114 based on the current flowing through the light source 116 can enable the control of the power provided to the light source 116, and thus the light emitted by the light source 116.

In some example embodiments, the power waveform 120 has characteristics that allow for variations in the distance D between the coil 110 and the coil 112 without significant variations in the light provided by the light source 116. To illustrate, the power provided to the light source 116 and the corresponding intensity of the light provided by the light source 116 depend on the leakage inductance L that itself depends on the distance D between the coil 110 and the coil 112 as shown in FIG. 2.

Figure 2:
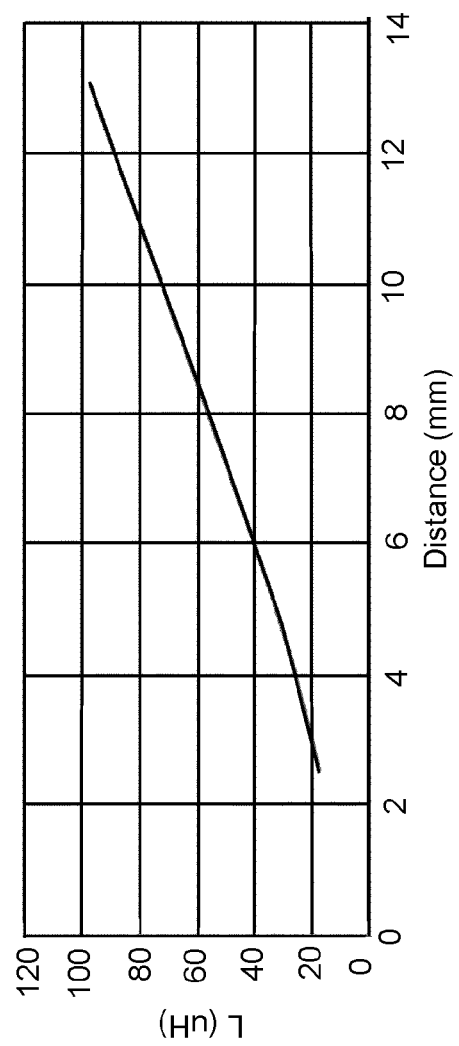
FIG. 2 is a graph showing the relationship between distance between the wireless power transmitter unit and the light module of the light fixture of FIG. 1 and leakage inductance according to an example embodiment.

FIG. 2 is a graph showing the relationship between distance D separating the coil 110 of the wireless power transmitter unit 102 and the coil 112 of the light module 104 of the light fixture 100 of FIG. 1 and the resulting leakage inductance according to an example embodiment. As shown in FIG. 2, the leakage inductance L proportional to the distance D between the coils 110 and 112. To illustrate, as the leakage inductance L increases the distance D between the coils 110 and 112 increases and as the leakage inductance L decreases the distance D between the coils 110 and 112 decreases.

Referring to FIGS. 1 and 2, in some example embodiments, to accommodate different values of the distance D separating the coils 110, 112 that correspond to different values of the leakage inductance L, the wireless power transmitter unit 102 may generate the power waveform 120 such that the power waveform 120 has a fundamental frequency component and a third harmonic frequency component that are substantially equally dominant frequency components of the power waveform 120. For example, the amplitude of the fundamental frequency component of the power waveform 120 may be equal to the amplitude of the third harmonic frequency component as explained in more detail with respect to FIGS. 8 and 9. As can be readily understood by those of ordinary skill in the art, the amplitudes of the fundamental frequency component and the third harmonic frequency component may be slightly different from each other within a tolerance margin.

As explained in more detail below, the equal or substantially equal amplitudes of the fundamental frequency component and the third harmonic frequency component can minimize the difference in the power delivered to the light source 116 at different values of the leakage inductance L corresponding to respective values of the distance D. In addition, by adjusting the capacitance of the resonance capacitor 114 based on the current flowing through the light source 116, the differences in the power delivered to the light source 116 for a range of the values of the leakage inductance L corresponding to a range of values of the distance D can be minimized.

In some alternative embodiments, the amplitude of the fundamental frequency component may be equal to both the amplitude of the third harmonic frequency component and the amplitude of the fifth harmonic frequency component of the power waveform 120. As can be readily understood by those of ordinary skill in the art, the amplitudes of the fundamental frequency component, the third harmonic frequency component, and the fifth harmonic frequency component may be slightly different from each other within a tolerance margin. The equal or substantially equal amplitudes of the fundamental frequency component, the third harmonic frequency component, and the fifth harmonic frequency component can minimize differences in the power delivered to the light source 116 at different values of the leakage inductance L corresponding to respective values of the distance D. In addition, by adjusting the capacitance of the resonance capacitor 114 based on the current flowing through the light source 116, the differences in the power delivered to the light source 116 for a range of the values of the leakage inductance L corresponding to a range of values of the distance D can be minimized.

By using the power waveform 120 to wirelessly transmit power from the wireless power transmitter unit 102 to the light module 104, the light fixture 100 can accommodate variations in the separation between the wireless power transmitter unit 102 and the light module 104 with relatively small or no changes in the light provided by the light fixture 100. As a non-limiting example, the separation (i.e., the distance D) between the wireless power transmitter unit 102 and the light module 104 may be varied by up to 10 mm with no or minimal and acceptable changes in the light provided by the light fixture 100. In some example embodiments, the distance D may be larger or smaller than 10 mm without departing from the scope of this disclosure.

In some alternative embodiments, the wireless power transmitter unit 102 may include more or fewer and/or different components than shown without departing from the scope of this disclosure. In some alternative embodiments, one or more components (e.g., the interface module 106) of the wireless power transmitter unit 102 may be omitted without departing from the scope of this disclosure. In some alternative embodiments, the light module 104 may include more or fewer and/or different components than shown without departing from the scope of this disclosure. In some alternative embodiments, one or more components of the light module 104 may be omitted or integrated without departing from the scope of this disclosure.

Figure 3:
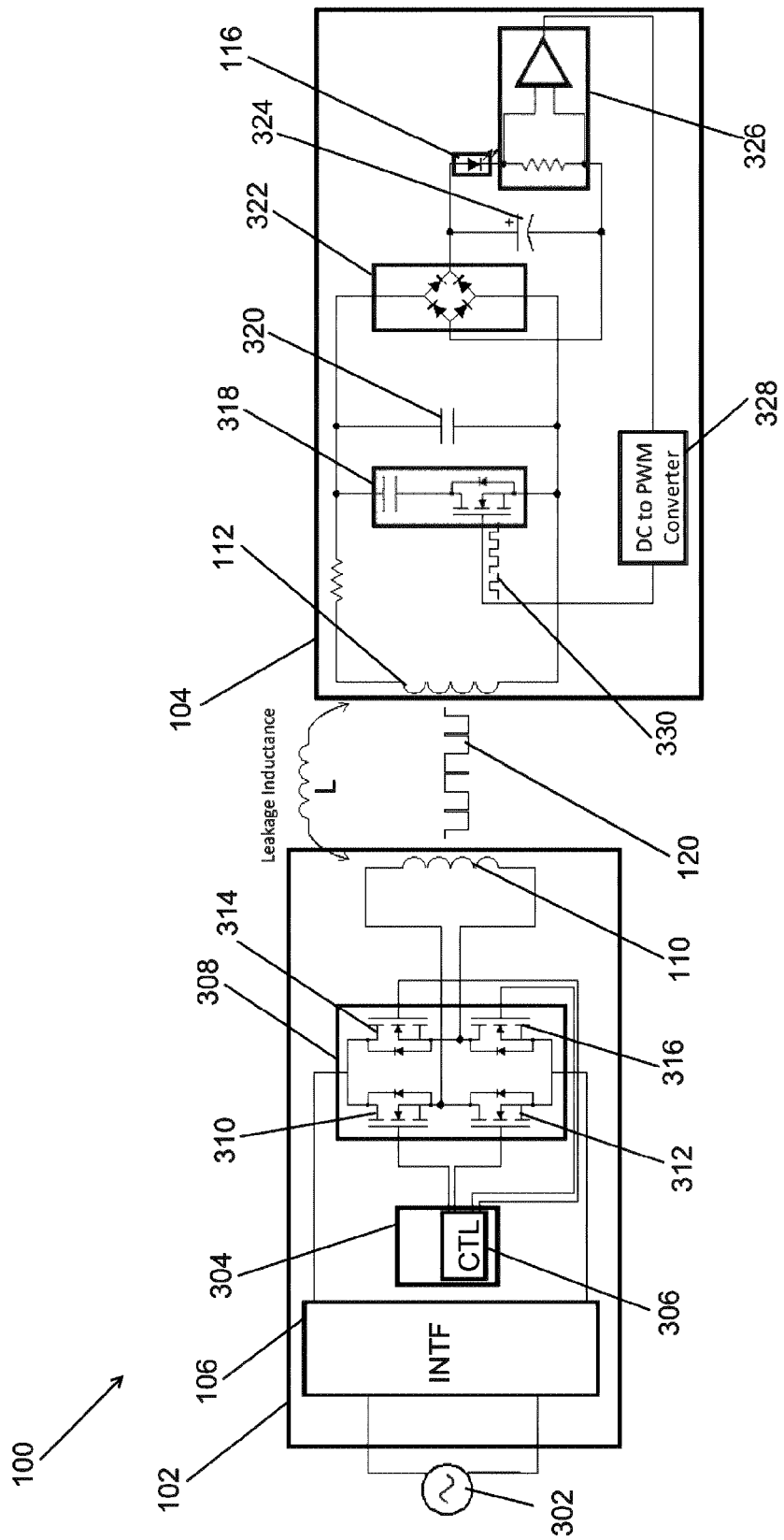
FIG. 3 illustrates details of the resonant coupling light fixture of FIG. 1 according to an example embodiment.

FIG. 3 illustrates details of the resonant coupling light fixture 100 of FIG. 1 according to an example embodiment. Referring to FIGS. 1-3, in some example embodiments, the wireless power transmitter unit 102 of the light fixture 100 may be coupled to an AC power source 302 (e.g., utility power supply) and may provide power to the light module 104 using the power waveform 120. For example, the wireless power transmitter unit 102 may receive AC voltage from the AC power source 302 via the input connection 122.

In some example embodiments, the wireless power transmitter unit 102 of the light fixture 100 includes the interface module 106, a pulse generator 304, and an H-bridge circuit 308. For example, the power waveform generator 108 described with respect to FIG. 1 may include the pulse generator 304 and the H-bridge circuit 308. The interface module 106 may be or include an AC-to-DC converter that generates DC voltage from the AC voltage received provided by the AC power supply 302. The interface module 106 may be coupled to the H-bridge circuit 308 and may provide the DC voltage to the H-bridge circuit 308. The H-bridge circuit 308 may include transistors 310, 312, 314, 316 that are controlled by the pulse generator 304, for example, by driving the gates of the transistors 310, 312, 314, 316 using respective gate control pulses.

Figure 8:
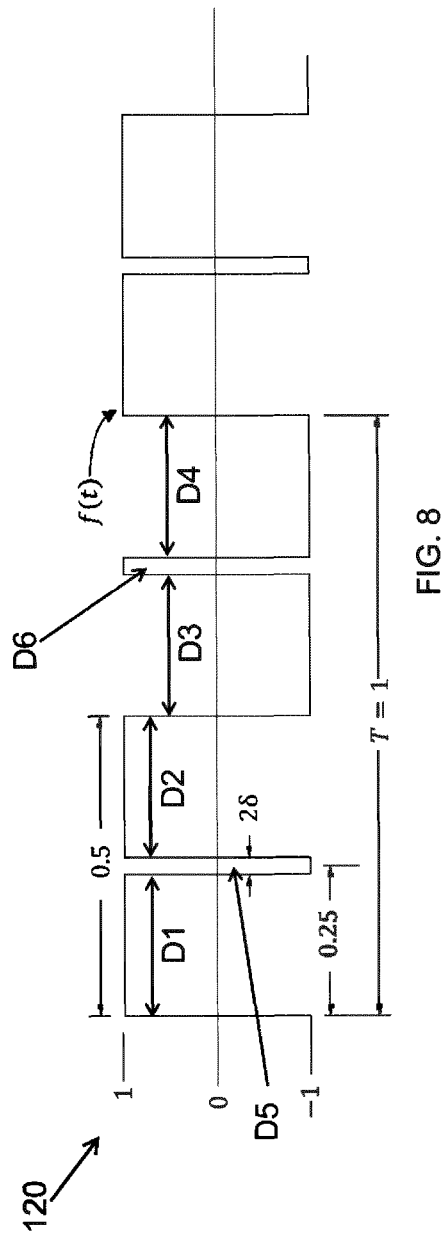
FIG. 8 illustrates a power waveform that is wirelessly provided to the light module of the resonant coupling light fixture of FIG. 1 according to an example embodiment.

In some example embodiments, the pulse generator 304 may include a controller 306 that executes software code stored in a memory device to generate gate control pulses to control the operation of the H-bridge circuit 308. The pulse generator 304 may also include other components such as a timer, etc. as can be readily understood by those of ordinary skill in the art with the benefit of the scope of this disclosure. The controller 306 may control the H-bridge circuit 308 using the gate control pulses to generate and transmit the power waveform 120 via the coil 110. To illustrate, the pulse generator 304 may generate the gate control pulses such that the transistors 310, 316 are on while the transistors 312, 314 are off and such that the transistors 310, 316 are off while the transistors 312, 314 are on. The controller 306 may vary the duration of individual gate control pulses to define the pulse widths of pulses of the power waveform 120. An example of the power waveform 120 generated and transmitted by the wireless power transmitter unit 102 is shown in FIG. 8.

As described above, the light module 104 is designed to be installed/positioned separated by a distance D from the wireless power transmitter unit 102. In some example embodiments, the light module 104 includes the coil 112, a switched capacitor 318, and a fixed capacitor 320. The coil 112 may be coupled to the switched capacitor 318 and the fixed capacitor 320. For example, the resonance capacitor 114 of the light module 104 described with respect to FIG. 1 may include the switched capacitor 318 and the fixed capacitor 320. The transfer of power from the wireless power transmitter unit 102 to the light source 116 of the light module 104 depends on the switched capacitor 318 and the fixed capacitor 320 along with the leakage inductance L between the coils 110 and 112.

In some example embodiments, the light module 104 includes a rectifier 322 and a DC output capacitor 324 that provide DC voltage/current to the light source 116 based on the power waveform 120 received via the coil 112. To illustrate, the rectifier 322 may be coupled to the switched capacitor 318 and the fixed capacitor 320. The rectifier 322 may be a bridge rectifier as shown in FIG. 3 or may be another type of full wave rectifier as can be readily understood by those of ordinary skill in the art with the benefit of the scope of this disclosure. The DC output capacitor 324 serves to smooth out the output of the rectifier 322 as can be readily understood by those of ordinary skill in the art with the benefit of the scope of this disclosure. The intensity of the light provided by the light source 116 may depend on the amount of power delivered to the light source 116 by the wireless power transmitter unit 102. The amount of power delivered to the light source 116 may depend on the leakage inductance L between the coils 110 and 112 and the switched capacitor 318 and the fixed capacitor 320 defining the resonance capacitor 114 as explained in more detail with respect to FIG. 4.

In some example embodiments, the light module 104 includes a current sensor 326 and a PWM circuit 328. For example, the feedback circuitry 118 of FIG. 1 may include the current sensor 326 and the PWM circuit 328. The current sensor 326 may be coupled to the light source 116 to sense the amount of current flowing through the light source 116. The current sensor 326 may output a DC signal indicative of the amount of current flowing through the light source 116. The PWM circuit 328 may be coupled to the current sensor 326 and may generate a PWM signal 330 based on the amount of current flowing through the light source 116 as indicated by the current sensor 326. For example, the PWM circuit 328 may include a DC to PWM converter circuit. The PWM circuit 328 may adjust the pulse width of the PWM signal 330 based on the amount of current flowing through the light source 116 to adjust (e.g., increase or decrease) or maintain the capacitance of the switched capacitor 318, which can result in changing or maintaining the power transferred to the light source 116 from the wireless power transmitter unit 102. The desired relationship between current amounts and pulse widths of the PWM signal 330 may be predetermined, for example, empirically or through calculations.

In some alternative embodiments, the wireless power transmitter unit 102 may include more, fewer, and/or different components than shown without departing from the scope of this disclosure. In some alternative embodiments, one or more of components the wireless power transmitter unit 102 may be omitted without departing from the scope of this disclosure. In some alternative embodiments, the light module 104 may include more, fewer, and/or different components than shown without departing from the scope of this disclosure. For example, a different type of current sensor or rectifier may be used. In some alternative embodiments, one or more components of the light module 104 may be omitted or integrated without departing from the scope of this disclosure.

Figure 4:
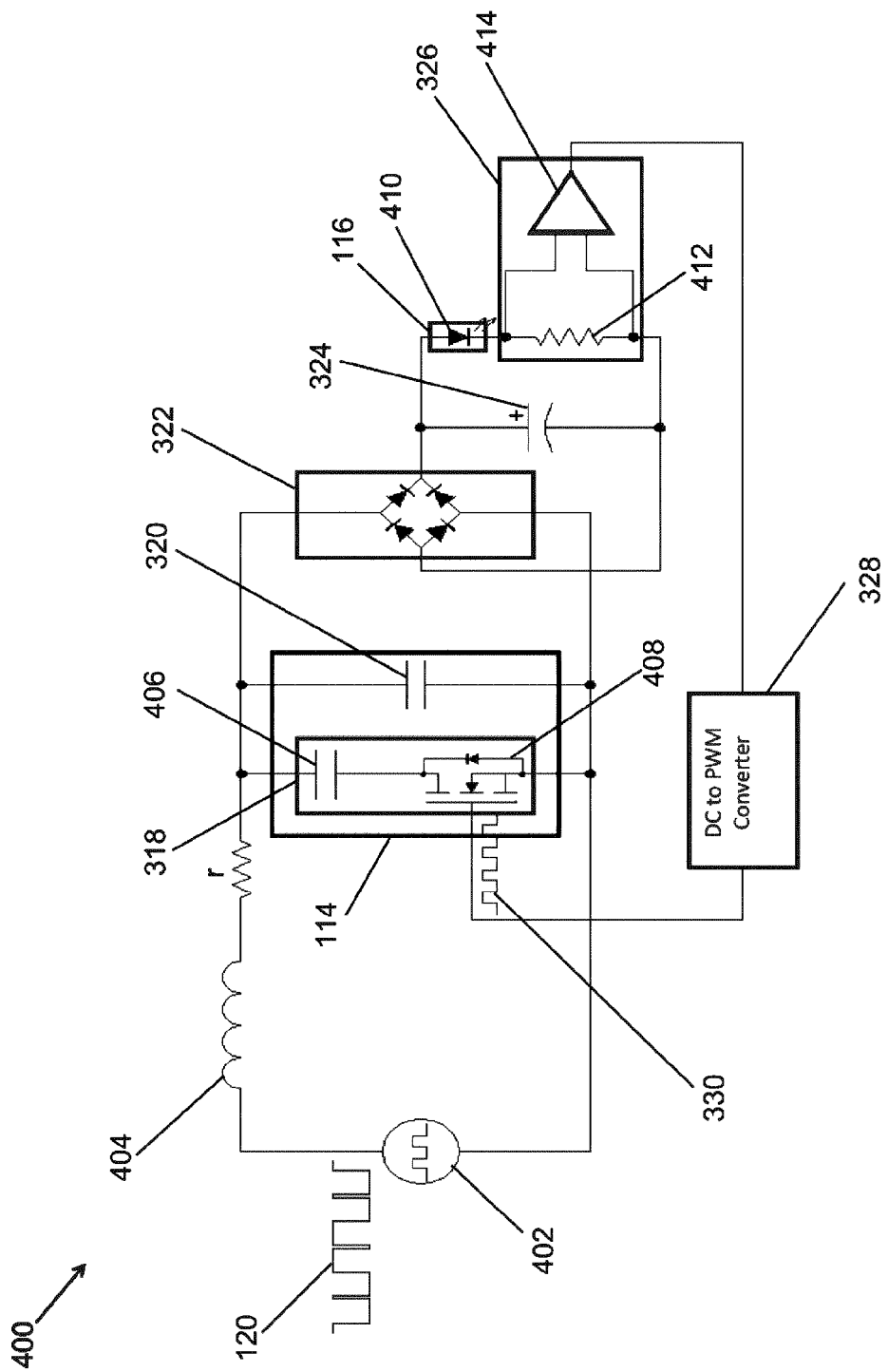
FIG. 4 illustrates a wired circuit representative of the light fixture of FIGS. 1 and 3 according to an example embodiment.

FIG. 4 illustrates a wired circuit 400 representative of the light fixture 100 of FIGS. 1 and 3 according to an example embodiment. Referring to FIGS. 1-4, in some example embodiments, the circuit 400 includes a waveform generator 402 that outputs the power waveform 120. To illustrate, the waveform generator 402 represents the wireless power transmitter unit 102 with respect to the generation of the power waveform 120. The circuit 400 also includes a resonance inductor 404 corresponding to the leakage inductance L between the coils 110 and 112 shown in FIGS. 1 and 3. The remaining components of the circuit 400 correspond to the components of the light module 104 shown in FIGS. 1 and 3. For example, the circuit 400 includes the resonance capacitor 114 that includes the switched capacitor 318 and the fixed capacitor 320. The switched capacitor 318 may include a capacitor 406 and a transistor 408 (e.g., a MOSFET), where the transistor 408 is controlled by the PWM circuit 328 using the PWM signal 330 to control the capacitance of the switched capacitor 318 and thus, the capacitance of the resonance capacitor 114.

In some example embodiments, the circuit 400 also includes the rectifier 322, the DC output capacitor 324, the light source 116, the current sensor 326, and the PWM circuit 328 that are included in the light module 104 shown in FIG. 3. The light source 116 may include one or more LEDs 410, and the current sensor 326 may include a resistor 412 and an operational amplifier 414 that operate to output a signal indicative of the current flowing through the light source 116.

In some example embodiments, the gain G of the circuit 400 can be estimated/calculated using Equation 1 below:

$$G = \frac{1}{2\pi fLC \sqrt{(2\pi f)^2 + \left(\frac{r}{L}\right)^2 - \frac{2}{LC} + \left(\frac{1}{RC}\right)^2 + \left(\frac{R+r}{2\pi fLCR}\right)^2}} \quad \text{Eq. 1}$$

In Equation 1, G is the gain of the circuit 400, which represents the efficiency of power transfer to the light source 116 from the waveform generator 402 (corresponding to the wireless power transmitter unit 102). Further, f is a frequency of a frequency component of the power waveform 120, L is the resonance inductance of the resonance inductor 404 corresponding to the leakage inductance L between the coils 110 and 112 shown in FIGS. 1 and 3, C is the resonance capacitance of the resonance capacitor 114, r represents wire resistance shown in FIG. 4, and R represents the load that includes the light source 116.

As can be readily understood from Equation 1, the gain G depends on the values of the resonance capacitance C and the resonance inductance L, and the resonance inductance L depends on the distance D between the coils 110 and 112 as explained above with respect to FIG. 2. The gain G is generally highest at the resonance frequency of the circuit 400, where the value of the resonance frequency depends the value of the resonance inductance L that depends on the distance D. In addition, the resonance frequency of the circuit 400 depends on the value of the resonance capacitance C, which can be changed/tuned by adjusting the capacitance of the switched capacitor 318 as described above with respect to FIG. 3.

With respect to a particular frequency component of the power waveform 120, the gain G of the circuit 400 is highest when the frequency of the particular frequency component matches the resonance frequency of the circuit 400. To illustrate, for a particular value of the resonance capacitance C, a first value of the distance D may correspond to a particular value of the resonance inductance L, where the resulting value of the resonance frequency of the circuit 400 matches the frequency of the fundamental frequency component of the power waveform 120. For example, FIG. 5 shows a graph 500 of the relationship between the distance D and the gain G with respect to a fundamental frequency of the power waveform 120 according to an example embodiment. To illustrate, in FIG. 5, the fundamental frequency (i.e., the frequency of the fundamental frequency component of the power waveform 120) may be 25 KHz, and the resonance capacitor C may have a value of 0.45 µF, at least at the highest gain value. As explained above with respect to FIG. 3, the resonance capacitance C may be changed/tuned to have the desired capacitance value by changing/tuning the capacitance of the switched capacitor 318. As can be readily observed from FIG. 7, the highest value of the gain G occurs when the distance D is approximately 12 mm (millimeters). In some alternative embodiments, the gain G with respect to the fundamental frequency of the power waveform 120 may be different than shown in FIG. 5 without departing from the scope of this disclosure.

In some example embodiments, for another value of the resonance capacitance C, a second value of the distance D may correspond to another value of the resonance inductance L, where the resulting value of the resonance frequency of the circuit 400 matches the frequency of the third harmonic frequency component of the power waveform 120. For example, FIG. 6 shows a graph 600 of the relationship between the distance D and the gain G with respect to a third harmonic frequency of the power waveform 120. In FIG. 6, the third harmonic frequency (i.e., the frequency of the third harmonic frequency component of the power waveform 120) may be 75 KHz, and the resonance capacitor C may have a value of 0.11 µF, at least at the highest gain value. As explained above with respect to FIG. 3, the resonance capacitance C may be changed/tuned to have the desired capacitance value by changing/tuning the capacitance of the switched capacitor 318. As can be readily observed from FIG. 6, the highest value of the gain G occurs when the distance D is approximately 5 mm (millimeters). In some alternative embodiments, the gain G with respect to the third harmonic frequency of the power waveform 120 may be different than shown in FIG. 6 without departing from the scope of this disclosure.

FIG. 7 shows a graph of the relationship between the distance D shown in FIG. 1 and the combined gain of the circuit 400 shown in FIG. 4 with respect the fundamental and third harmonic frequencies of the power waveform 120 of FIG. 1 according to an example embodiment. In FIG. 7, the peak values of the combined gain correspond to the highest values of the gain G shown in FIGS. 5 and 6. Referring to FIGS. 1-7, in contrast to the individual gains with respect to the fundamental and third harmonic frequencies shown in FIGS. 5 and 6, the combined gain shown in FIG. 7 remains within a relatively narrow range for a larger range of values of the distance D between the coils 110, 112. In particular, at the values of the distance D resulting in the resonant frequency of the circuit 400 matching the fundamental and third harmonic frequencies of the power waveform 120, the difference in the values of the combined gain is minimal. To maintain the gain G in a narrow range for a range of values of the resonance inductance L, the resonance capacitance C can be set/changed by the PWM circuit 328 by controlling the capacitance of the switched capacitor 318 based on the current flowing through the light source 116. In some alternative embodiments, the combined gain may be different than shown in FIG. 7 without departing from the scope of this disclosure.

Figure 9:
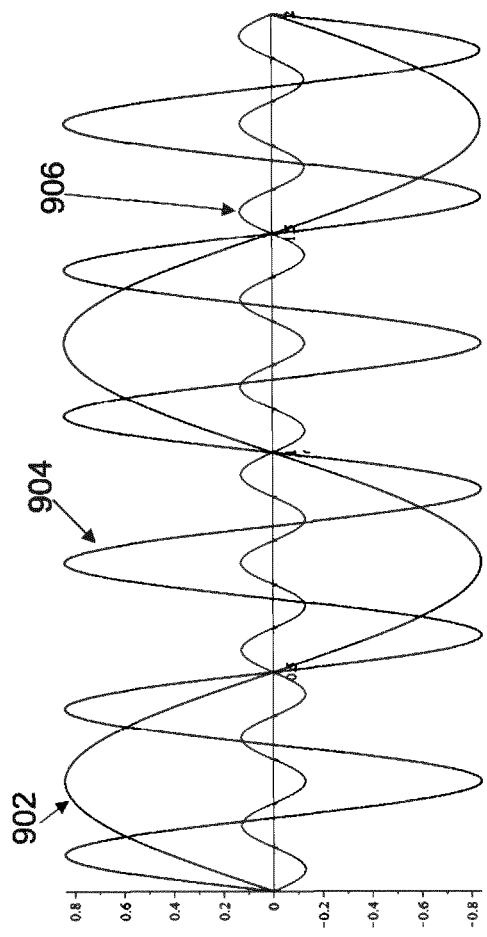
FIG. 9 illustrates the fundamental, third harmonic, and fifth harmonic frequency components of the power waveform of FIGS. 1 and 8 according to an example embodiment.

FIG. 8 illustrates the power waveform 120 (also labelled f(t) in FIG. 8) that is wirelessly provided to the light module 104 of the resonant coupling light fixture 100 of FIG. 1 according to an example embodiment, and FIG. 9 illustrates the fundamental, third harmonic, and fifth harmonic frequency components of the power waveform 120 of FIGS. 1 and 8 according to an example embodiment. Referring to FIGS. 1-9, in some example embodiments, the power waveform 120 may be a pulse wave as shown in FIG. 8. For example, as shown in FIG. 8, the power waveform 120 may be a periodic pulse wave/waveform that has a high value during first two durations D1, D2 (i.e., the first duration D1 and the second duration D2) in a half portion of a period T and a low value during second two durations D3, D4 (i.e., the third duration D3 and the fourth duration D4) in the other half portion of the period T, where the first two durations D1, D2 are separated from each other by a duration D5, where the second two durations D3, D4 are separated from each other by a duration D6, where the waveform has the low value during the duration D5, where the waveform has the high value during the duration D6. The high value (shown as 1 in FIG. 8) and the low value (shown as −1 in FIG. 8) can be scaled and/or offset as can be readily understood by those of ordinary skill in the art with the benefit of the scope of this disclosure.

In some example embodiments, the duration D5 may equal the duration D6. For example, the duration D5 and the duration D6 may each be 2δ wide as shown in FIG. 8. The sum of 2δ and the durations D1 and D2 equals half of the period T, which generically is shown as being equal to 1 in FIG. 8 and can be scaled based on a particular frequency as can be readily understood by those of ordinary skill in the art with the benefit of the scope of this disclosure. The sum of 2δ and the durations D3 and D4 also equals half of the period T. The sum of 3 and any one of the durations D1, D2, D3, or D4 equals a quarter of the period T.

In some example embodiments, the power waveform 120 may be described as a periodic pulse wave/waveform that includes, within a period T of the pulse wave/waveform, two high pulses with the durations D1 and D2 in a half portion of the period and two low pulses with durations D3 and D4 in the other half portion of the period, where the two high pulses are separated by a low pulse with the duration D5 and where the two low pulses are separated by a high pulse with the duration D6.

Equation 2 below provides a Fourier series representation of power waveform 120 represented by f(t):

$$f(t) = a_v + \Sigma_{n=1}^{28} a_n \cos(n\omega t) + b_n \sin(n\omega t) \quad \text{Eq. 2}$$

where $$a_v = \frac{1}{T} \int_{t_0}^{t_0+T} f(t) dt;$$

$$a_k = \frac{2}{T} \int_{t_0}^{t_0+T} f(t) \cos(k\omega t) dt; \text{ and}$$

-continued $$b_k = \frac{2}{T} \int_{t_0}^{t_0+T} f(t)$$

sin(kωt) dt, where k is odd and positive integer representing to the fundamental and odd harmonics of f(t).

In Equation 2, because f(t) is symmetrical and therefore has zero time-average value, $a_v = 0$. Further, $a_k$ equals zero as determined according to Eq. 3 below:

$$a_k = \frac{2}{T}\left[\int_{t_0}^{t_0+\frac{T}{4}-\delta} \cos(k\omega t)dt - \int_{t_0+\frac{T}{4}-\delta}^{t_0+\frac{T}{4}+\delta} \cos(k\omega t)dt + \int_{t_0+\frac{T}{4}+\delta}^{t_0+\frac{T}{2}} \cos(k\omega t)dt - \int_{t_0+\frac{T}{2}}^{t_0+\frac{3T}{4}-\delta} \cos(k\omega t)dt + \int_{t_0+\frac{3T}{4}-\delta}^{t_0+\frac{3T}{4}+\delta} \cos(k\omega t)dt - \int_{t_0+\frac{3T}{4}+\delta}^{t_0+T} \cos(k\omega t)dt \right] = 0 \quad \text{Eq. 3}$$

$b_k$ can be determined according to Eq. 4 below:

$$b_k = \frac{2}{T}\left[\int_{t_0}^{t_0+\frac{T}{4}-\delta} \sin(k\omega t)dt - \int_{t_0+\frac{T}{4}-\delta}^{t_0+\frac{T}{4}+\delta} \sin(k\omega t)dt + \int_{t_0+\frac{T}{4}+\delta}^{t_0+\frac{T}{2}} \sin(k\omega t)dt - \int_{t_0+\frac{T}{2}}^{t_0+\frac{3T}{4}-\delta} \sin(k\omega t)dt + \int_{t_0+\frac{3T}{4}-\delta}^{t_0+\frac{3T}{4}+\delta} \sin(k\omega t)dt - \int_{t_0+\frac{3T}{4}+\delta}^{t_0+T} \sin(k\omega t)dt\right] \quad \text{Eq. 4}$$

Equation 4 can be reduced to Equation 5 shown below:

$$b_k = \frac{4 - 8(-1)^{\left(\frac{k+3}{2}\right)}\sin(2k\pi\delta)}{k\pi} \quad \text{Eq. 5}$$

where k is odd and positive integer corresponding to the fundamental and odd harmonic frequency components of f(t) (i.e., power waveform 120). Because $a_v$ and $a_k$ in Equation 2 are zero, Equation 2 is reduced to Equations 6 and 7 shown below:

$$f(t) = \Sigma_{n=1}^{\infty} b_n \sin(n\omega t) \quad \text{Eq. 6}$$

$$f(t) = b_1 \sin(\omega t) + b_3 \sin(3\omega t) + b_5 \sin(5\omega t) + \ldots \quad \text{Eq. 7}$$

where $$\omega = \frac{2\pi}{T}.$$

In Equation 7, for k=1, $b_k$ is $b_1$ and represents the amplitude of the fundamental frequency component. For k=3, $b_k$ is $b_3$ and represents the amplitude of the third harmonic component. For k=5, $b_k$ is $b_5$ and represents the amplitude of the third harmonic component.

TABLE 1 shows simplified forms of Equation 5 for different values of k with the period T set to 1.

| k | $b_k$ |
|---|---|
| 1 | $\dfrac{4 - 8\sin(2\pi\delta)}{\pi}$ |
| 3 | $\dfrac{4 + 8\sin(6\pi\delta)}{3\pi}$ |
| 5 | $\dfrac{4 - 8\sin(10\pi\delta)}{5\pi}$ |

As shown in FIG. 9, the power waveform 120 may have a fundamental frequency component 902 and a third harmonic frequency component 904. In contrast to a typical square waveform, where an amplitude of the third harmonic frequency component is one-third of the amplitude of the fundamental frequency component, in FIG. 9, the amplitude of the third harmonic frequency component 904 of the power waveform 120 equals the amplitude of the fundamental frequency component 902. To generate the power waveform 120 of FIG. 8 that includes the frequency components shown in FIG. 9, the durations D5 and D6 shown in FIG. 8, which equal 2δ each, are determined by solving for δ in Equation 5 using the corresponding equations for $b_1$ and $b_3$ in Table 1 set equal to each other.

To illustrate, δ equals 0.0272 and 2δ (i.e., each duration D5, D6) equals 0.0544 (i.e., 5.44% of T) in FIG. 8 when the fundamental frequency component 902 and the third harmonic frequency component 904 have equal amplitudes as shown in FIG. 9 (i.e., when $b_1$ is set equal to $b_3$). As shown in FIG. 9, the fifth harmonic component 906 of the power waveform 120 has an amplitude that is a fraction of the amplitude of the fundamental frequency component 902. Referring to FIGS. 1-9, if, for example, the frequency of the power waveform 120 is 100 KHz, T equals 10 μs, and 2 δ equals 0.544 μs. After the durations D5 and D6 are determined, the durations D1-D4 may be determined based on the durations D5 and D6 and the period T as can be readily understood by those of ordinary skill in the art with the benefit of the scope of this disclosure. The wireless power transmitter unit 102 of FIG. 1 may generate the power waveform 120 with the desired values of the durations (i.e., D1, D2, D3, D4, D5, D6) such that the fundamental frequency component 902 and the third harmonic frequency component 904 of the power waveform 120 have equal or substantially equal amplitudes.

Because the fundamental frequency component 902 and the third harmonic frequency component 904 are equal and because the reasonably consistent gain G of the light fixture 100 of FIGS. 1 and 3 (as represented by the circuit 400 of FIG. 4) at the frequencies of the frequency components 902, 904, the amount of power transferred to the light source 116 of the light fixture 100 and the light provided by the light source 116 can remain reasonably consistent at different separations of the wireless power transmitter unit 102 and the light module 104. In addition, because the gain G of the light fixture 100 of FIGS. 1 and 3 is within a relatively narrow range for a range of values of the distance D as shown in FIG. 7, the amount of power transferred to the light source 116 of the light fixture 100 and the light provided by the light source 116 can remain reasonably consistent for a range of the distance D.

Referring to FIGS. 1-9, in general, the method of operation of the light fixture 100 in providing a light includes the step of providing power, by the wireless power transmitter unit 102, wirelessly to the light module 104 by wirelessly transmitting the power waveform 120. The method further includes the steps of receiving, by the light module 104, the power waveform 120 transmitted by the wireless power transmitter unit 102 and providing, by the light module 104, a light based on the power received from the wireless power transmitter unit 102 via the power waveform 120. As described above, the fundamental frequency component 902 of the power waveform 120 and the third harmonic frequency component 904 of the power waveform 120 have equal amplitudes.

In some alternative embodiments, the power waveform 120 may be generated such that the amplitude of the fifth harmonic component 906 and/or another frequency component of the power waveform 120 has/have the same amplitude as the fundamental frequency component 902 and the third harmonic frequency component 904 by determining the durations D1-D6 of the power waveform 120 in a similar manner as described above with respect to the fundamental frequency component 902 and the third harmonic frequency component 904. In some alternative embodiments, the power waveform 120 may have different durations, pulses, etc. than shown while having the same amplitude for different frequency components without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A lighting device having wireless resonant coupling, the lighting device comprising:
   a wireless power transmitter unit including a first coil configured to wirelessly transmit a power waveform;
   a light module comprising a light source and a second coil located at a distance from the first coil and configured to receive the power waveform, the light module configured to provide a light, wherein the wireless power transmitter unit is configured to provide power to the light module wirelessly by transmitting a power waveform to the light module and wherein an amplitude of a fundamental frequency component of the power waveform equals an amplitude of a third harmonic frequency component of the power waveform to minimize differences in the power waveform delivered to the light source at different values of the distance.

2. The lighting device of claim 1, wherein the power waveform is a periodic pulse wave having a high value during a first duration and during a second period and a low value during a third duration and during a fourth duration, wherein the first period and the second period are in a first half portion of a period of the periodic pulse wave and separated from each other by a fifth duration, and wherein the third period and the fourth period are in second half portion of the period and separated from each other by a sixth duration.

3. The lighting device of claim 2, wherein the periodic pulse wave has the low value during the first duration and wherein the periodic pulse wave has the high value during the second duration.

4. The lighting device of claim 2, wherein the first two durations are equal to each other and wherein the second two durations are equal to each other.

5. The lighting device of claim 2, wherein the first duration D5 and the second duration each is approximately 5.44 percent of the period of the periodic pulse wave.

6. The lighting device of claim 1, wherein an amplitude of a fifth harmonic frequency component of the power waveform is approximately one-fifth of the amplitude of the fundamental frequency component of the power waveform.

7. The lighting device of claim 1, wherein an amplitude of a fifth harmonic frequency component of the power waveform equals the amplitude of the fundamental frequency component of the power waveform.

8. The lighting device of claim 1, wherein the wireless power transmitter unit is configured to receive alternating current voltage and generate the power waveform based on the AC voltage.

9. The lighting device of claim 8, wherein the wireless power transmitter unit comprises an AC to DC converter configured to generate a DC voltage from the AC voltage and wherein the wireless power transmitter unit is configured to generate the power waveform using the DC voltage.

10. The lighting device of claim 1, wherein the wireless power transmitter unit is configured to receive direct current voltage and generate the power waveform based on the DC voltage.

11. The lighting device of claim 1, wherein the wireless power transmitter unit comprises a controller and an H-bridge circuit and wherein the controller is configured to control the H-bridge circuit to generate the power waveform.

12. The lighting device of claim 11, wherein the first coil is coupled to the H-bridge circuit and configured to wirelessly transmit the power waveform and the second coil is configured to receive the power waveform.

13. The lighting device of claim 11, wherein the light module further comprises a switched capacitor having a capacitance that is controlled based on a DC current flowing through the light source.

14. The lighting device of claim 13, wherein the light module further comprises a current sensor and a pulse width modulation circuit, wherein the current sensor is configured to sense the DC current flowing through the light source, and wherein the PWM circuit is configured to control the switched capacitor based on the DC current flowing through the light source indicated by the current sensor.

15. A method of operation of a resonant coupling wireless light fixture, the method comprising:
providing power, by a wireless power transmitter unit including a first coil of the resonant coupling wireless light fixture, wirelessly to a light module having a second coil located at a distance from the first coil of the resonant coupling wireless light fixture by wirelessly transmitting a power waveform;
receiving, by the light module, the power waveform transmitted by the wireless power transmitter unit; and
minimizing differences in the power waveform delivered to the light source at different values of the distance by providing, by the light module, a light based on the power received from the wireless power transmitter unit via the power waveform, wherein a fundamental frequency component of the power waveform and a third harmonic frequency component of the power waveform have equal amplitudes.

\* \* \* \* \*